US006817139B1

(12) United States Patent
Powell et al.

(10) Patent No.: US 6,817,139 B1
(45) Date of Patent: Nov. 16, 2004

(54) BUG KILLING SYSTEM

(76) Inventors: William E. Powell, 11549 Corwin St., Gibsonton, FL (US) 33534; Janice E. Powell, 11549 Corwin St., Gibsonton, FL (US) 33534; William B. Reed, 7024 Oyster Bay Dr., Tampa, FL (US) 33619

( * ) Notice: Subject to any disclaimer, the term of this patent is extended or adjusted under 35 U.S.C. 154(b) by 0 days.

(21) Appl. No.: 10/341,285

(22) Filed: Jan. 13, 2003

(51) Int. Cl.⁷ .............................................. A01M 1/08
(52) U.S. Cl. .......................................... 43/113; 43/139
(58) Field of Search ............................. 43/112, 113, 139

(56) References Cited

U.S. PATENT DOCUMENTS

| | | | | |
|---|---|---|---|---|
| 783,752 A | * | 2/1905 | Marston | 43/139 |
| 970,181 A | * | 9/1910 | Carter | 43/139 |
| 1,037,688 A | * | 9/1912 | Troth | 43/113 |
| 1,807,550 A | * | 5/1931 | Rector | 43/139 |
| 1,996,293 A | * | 4/1935 | House | 43/113 |
| 2,513,544 A | * | 7/1950 | Yarbrough | 43/113 |
| 2,780,026 A | * | 2/1957 | Dail et al. | 43/113 |
| 2,931,127 A | * | 4/1960 | Mayo | 43/139 |
| 3,059,373 A | * | 10/1962 | Gardner | 43/113 |
| 3,120,075 A | * | 2/1964 | Barnhart | 43/139 |
| 3,152,420 A | * | 10/1964 | Pawl | 43/139 |
| 3,187,458 A | * | 6/1965 | Densmore | 43/113 |
| 3,196,577 A | * | 7/1965 | Plunkett | 43/139 |
| 3,201,893 A | * | 8/1965 | Jorgen | 43/139 |
| 3,540,145 A | * | 11/1970 | McEwen | 43/113 |
| 4,282,673 A | * | 8/1981 | Focks et al. | 43/113 |
| 4,366,643 A | * | 1/1983 | Boaz | 43/113 |
| 4,519,776 A | * | 5/1985 | DeYoreo et al. | 43/113 |
| 4,788,789 A | * | 12/1988 | Boobar et al. | 43/113 |
| 4,856,226 A | * | 8/1989 | Taylor | 43/113 |
| 5,014,460 A | * | 5/1991 | Patti et al. | 43/113 |
| 5,157,865 A | * | 10/1992 | Chang | 43/113 |
| 5,329,725 A | * | 7/1994 | Bible | 43/113 |
| 5,669,176 A | * | 9/1997 | Miller | 43/139 |
| 5,799,436 A | * | 9/1998 | Nolen et al. | 43/112 |
| 5,813,166 A | * | 9/1998 | Wigton et al. | 43/113 |
| 5,968,401 A | * | 10/1999 | Roy | 43/112 |
| 6,050,025 A | * | 4/2000 | Wilbanks | 43/139 |
| 6,055,766 A | * | 5/2000 | Nolen et al. | 43/112 |
| 6,145,243 A | * | 11/2000 | Wigton et al. | 43/139 |
| 6,286,249 B1 | * | 9/2001 | Miller et al. | 43/139 |
| 6,305,122 B1 | * | 10/2001 | Iwao et al. | 43/112 |
| 6,339,897 B1 | * | 1/2002 | Hayes et al. | 43/132.1 |
| 6,530,172 B2 | * | 3/2003 | Lenz | 43/112 |
| 6,568,124 B1 | * | 5/2003 | Wilbanks | 43/113 |
| 6,594,946 B2 | * | 7/2003 | Nolen et al. | 43/112 |
| 6,655,080 B2 | * | 12/2003 | Spiro et al. | 43/139 |

FOREIGN PATENT DOCUMENTS

| | | | | |
|---|---|---|---|---|
| AU | 27166 B1 | * | 6/1930 | 43/113 |
| BR | 9503912 B1 | * | 10/1997 | |
| CA | 631512 B1 | * | 11/1961 | 43/139 |
| CA | 2073163 B1 | * | 1/1994 | |
| CA | 2099389 B1 | * | 12/1994 | |
| CA | 2259366 B1 | * | 7/2000 | |
| IT | 531302 B1 | * | 8/1955 | 43/113 |
| JP | 2001-155509 B1 | * | 6/2001 | |
| JP | 2001-231424 B1 | * | 8/2001 | |
| KR | 2002-17584 B1 | * | 3/2002 | |
| KR | 2002-21466 B1 | * | 3/2002 | |
| WO | WO 01/01768 A1 | * | 1/2001 | |

* cited by examiner

Primary Examiner—Darren W. Ark
(74) Attorney, Agent, or Firm—Edward P. Dutkiewicz

(57) ABSTRACT

A first housing has an open end and a sidewall with at least one slot. A second housing has an open first end in operative association with the open end of the first housing. The second housing has an open second end. A fan assembly is secured between the first and second housings to effect a flow of air through the slot and open second end of the second housing. A mesh fabric entraps insects entrained against the fabric by the flow of air through the fabric. A source of light within the first housing attracts flying insects toward the slot and into the first housing. Once in the first housing the flow of air from the fan will entrain the flying insects in a path of movement from the first housing to the second housing and then to the fabric.

6 Claims, 4 Drawing Sheets

FIG 3
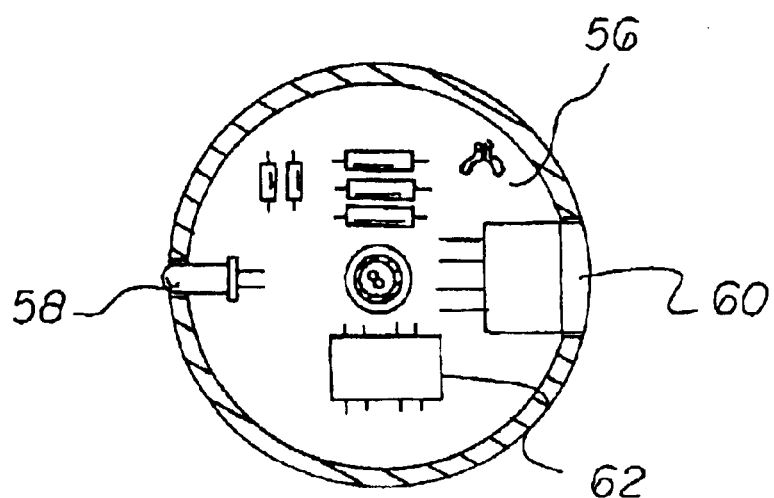
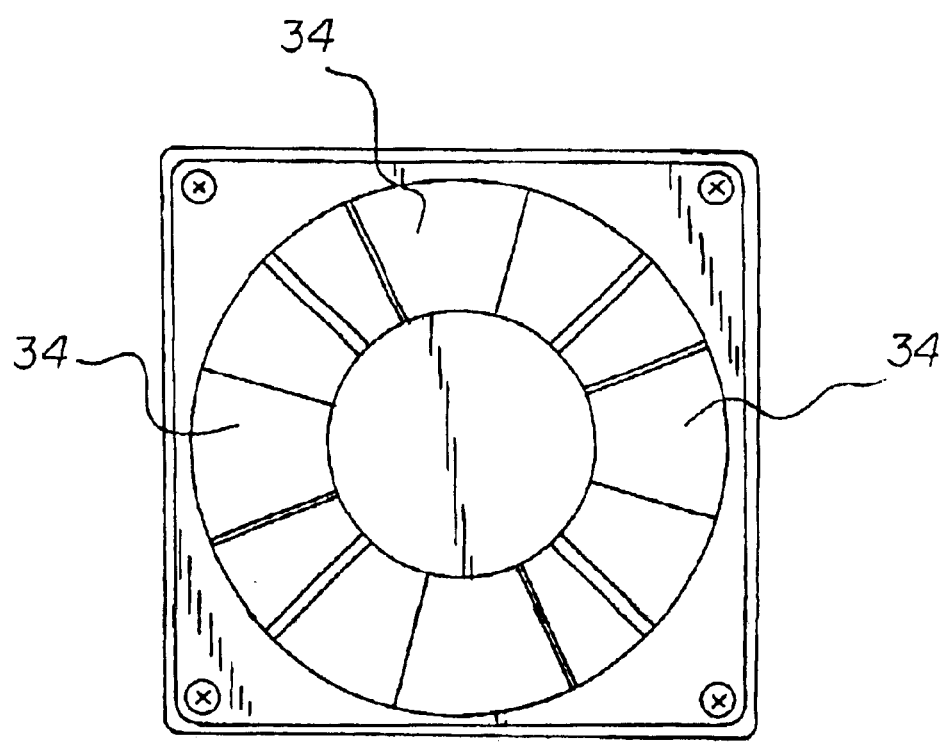
FIG 4

# BUG KILLING SYSTEM

BACKGROUND OF THE INVENTION

1. Field of the Invention

The present invention relates to a bug killing system and more particularly pertains to reliably attracting, entraining and dehydrating flying insects.

2. Description of the Prior Art

The use of bug killing systems for reliably attracting, entraining and dehydrating flying insects is known in the prior art. More specifically, bug eradicating systems previously devised and utilized for the purpose of eradicating insects are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,301,456 to Jobin et al. discloses a portable luminous insect trap. U.S. Pat. No. 2,931,127 to Mayo discloses insect catchers. U.S. Pat. No. 1,484,369 discloses a flycatcher. U.S. Pat. No. 5,329,725 to Bible discloses a bug light and bag apparatus. U.S. Pat. No. 3,796,001 to Jackson discloses a mosquito trap. U.S. Pat. No. 5,157,865 to Chang discloses a cantilever type mosquito catcher. U.S. Pat. No. 6,286,249 to Miller et al. U.S. Pat. No. 4,856,226 to Taylor discloses a vacuum insect eradication device. U.S. Pat. No. 5,020,270 to Lo discloses an apparatus for killing insects. U.S. Pat. No. 5,647,164 to Yates discloses an insect trap. Insects are killed by passing through a fan mounted inside a shaft. U.S. Pat. No. 3,319,374 issued May 16, 1967 to Gawne discloses a combination utility light and insect attracting and destroying device. U.S. Pat. No. 6,199,316 to Coventry discloses an apparatus for providing a slow release of a compressed gas and an insect trap incorporating same. U.S. Pat. No. 5,184,417 to Weldon discloses a flea trap apparatus. U.S. Pat. No. 6,112,453 to Clarke, Jr. discloses a mosquito larvae light trap. U.S. Pat. No. 5,513,465 to Demarest et al. discloses a method and apparatus for catching insects. U.S. Pat. No. Des. 189,782 to Richardson discloses an insect exterminator. Finally, U.S. Pat. No. Des. 427,352 to Miranda discloses a lantern.

While these devices fulfill their respective, particular objectives and requirements, the aforementioned patents do not describe a bug killing system that reliably attracts, entrains and dehydrates flying insects.

In this respect, the bug killing system according to the present invention substantially departs from the conventional concepts and designs of the prior art, and in doing so provides an apparatus primarily developed for the purpose of reliably attracting, entraining and dehydrating flying insects.

Therefore, it can be appreciated that there exists a continuing need for a new and improved bug killing system which can be used for reliably attracting, entraining and dehydrating flying insects. In this regard, the present invention substantially fulfills this need.

SUMMARY OF THE INVENTION

In view of the foregoing disadvantages inherent in the known types of bug eradicating systems now present in the prior art, the present invention provides an improved bug killing system. As such, the general purpose of the present invention, which will be described subsequently in greater detail, is to provide a new and improved bug killing system and method which has all the advantages of the prior art and none of the disadvantages.

To attain this, the present invention essentially comprises an upper housing. The upper housing is fabricated of a rigid plastic material. The upper housing has an open top and an open bottom. A sidewall is provided between the open top and the open bottom. At least one slot is provided in the sidewall.

A lower housing is provided next. The lower housing is fabricated of a rigid plastic material. The lower housing has an open top. The open top is in operative association with the open bottom of the upper housing. The lower housing also has an open bottom.

Next provided is a fan assembly. The fan assembly has blades. The blades are rotatable in a generally horizontal plane. The blades are removably secured between the upper housing and the lower housing. In this manner the flow of air through the slot of the upper housing through the open bottom of the lower housing is effected.

Provided next is mesh fabric. The mesh fabric is a shape essentially corresponding to the shape of the lower housing. The mesh fabric is located adjacent to the sidewalls and the open bottom of the lower housing. In this manner the open top of the lower housing and the open bottom of the upper housing are left open to entrap insects entrained against the mesh fabric by the flow of air through the mesh fabric.

Also provided is a source of light. The source of light is provided in the upper housing with a central portion. The source of light is further laterally offset from the slot to attract flying insects toward the slot and into the upper housing. In this manner the flow of air from the fan will entrain the flying insects in a path of movement from the upper housing to the lower housing and then to the mesh fabric at the open bottom of the lower housing. The continued flow of air will then cause the dehydration and death of the insects.

Further provided is a removable cap. The removable cap is positionable on the open top of the upper housing. The removable cap has a ring for support. An electrical line is provided from a power supply to the source of light and the fan assembly.

Provided last are control components. The control components are operatively coupled to the source of light and fan assembly. The control components include a light emitting diode 58. The light emitting diode indicates that power is on to the system. The control components also include a light sensor. The light sensor senses the ambient condition and activates the source of light during sensed darkness. In response to the light sensor sensing darkness, the fan is operated at full speed. Full speed is approximately 3600 revolutions per minute. Operating the fan at full speed attracts and retains the flying insects to the mesh fabric. The light sensor further inactivates the source of light during sensed daylight. In response to the light sensor sensing daylight, the fan is operated at half speed. Half speed is approximately 1800 revolutions per minute. Operating the fan at half speed retains the flying insects against the mesh fabric. The control components also include a temperature sensor. The temperature sensor inactivates the fan but not the source of light when the temperature falls below between about 35 and 45 degrees Fahrenheit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bug killing system which has all of the advantages of the prior art bug eradicating systems and none of the disadvantages.

It is another object of the present invention to provide a new and improved bug killing system which may be easily and efficiently manufactured and marketed.

It is further an object of the present invention to provide a new and improved bug killing system which is of durable and reliable constructions.

An even further object of the present invention is to provide a new and improved bug killing system which is susceptible of a low cost of manufacture with regard to both materials and labor, and which accordingly is then susceptible of low prices of sale to the consuming public, thereby making such bug killing system economically available to the buying public.

Even still another object of the present invention is to provide a bug killing system for reliably attracting, entraining and dehydrating flying insects.

Lastly, it is an object of the present invention to provide a new and improved bug killing system. A first housing has an open end and a sidewall. At least one slot is in the sidewall. A second housing has an open first end. The open first end is in operative association with the open end of the first housing. The second housing has an open second end. A fan assembly is secured between the first and second housings to effect a flow of air through the slot and open second end of the second housing. A mesh fabric entraps insects entrained against the fabric by the flow of air through the fabric. A source of light within the first housing attracts flying insects toward the slot and into the first housing. Once in the first housing the flow of air from the fan will entrain the flying insects in a path of movement from the first housing to the second housing and then to the fabric.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the system taken along line 3—3 of FIG. 1.

FIG. 4 is a cross-sectional view of the system taken along line 4—4 of FIG. 1.

The same reference numerals refer to the same parts throughout the various Figures.

DESCRIPTION OF THE PREFERRED EMBODIMENT

Figures 1, 2:
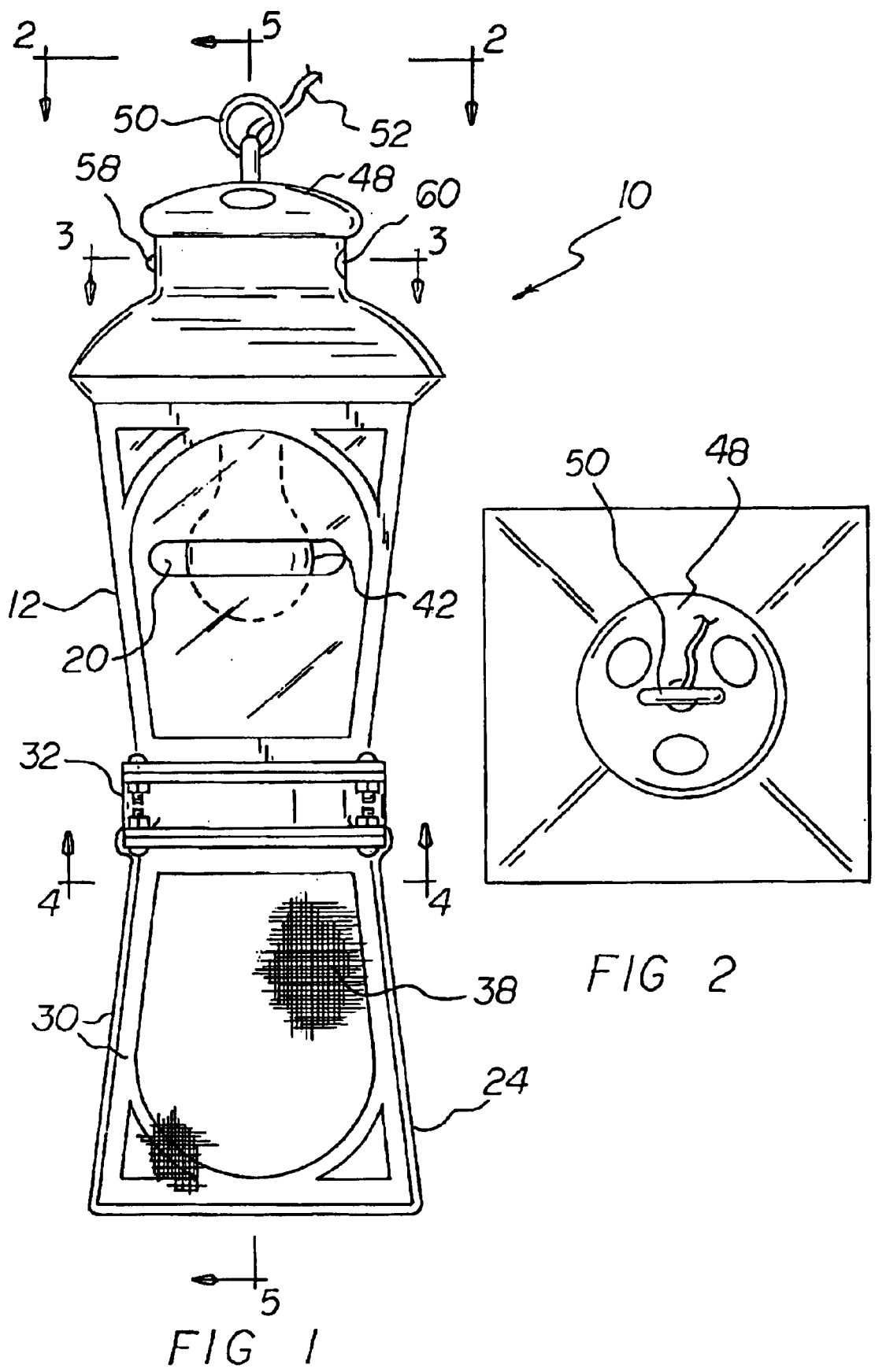
FIG. 1 is a front elevational view of a bug killing system constructed in accordance with the principles of the present invention.
FIG. 2 is plan view of the system taken along line 2—2 of FIG. 1.
Figure 5:
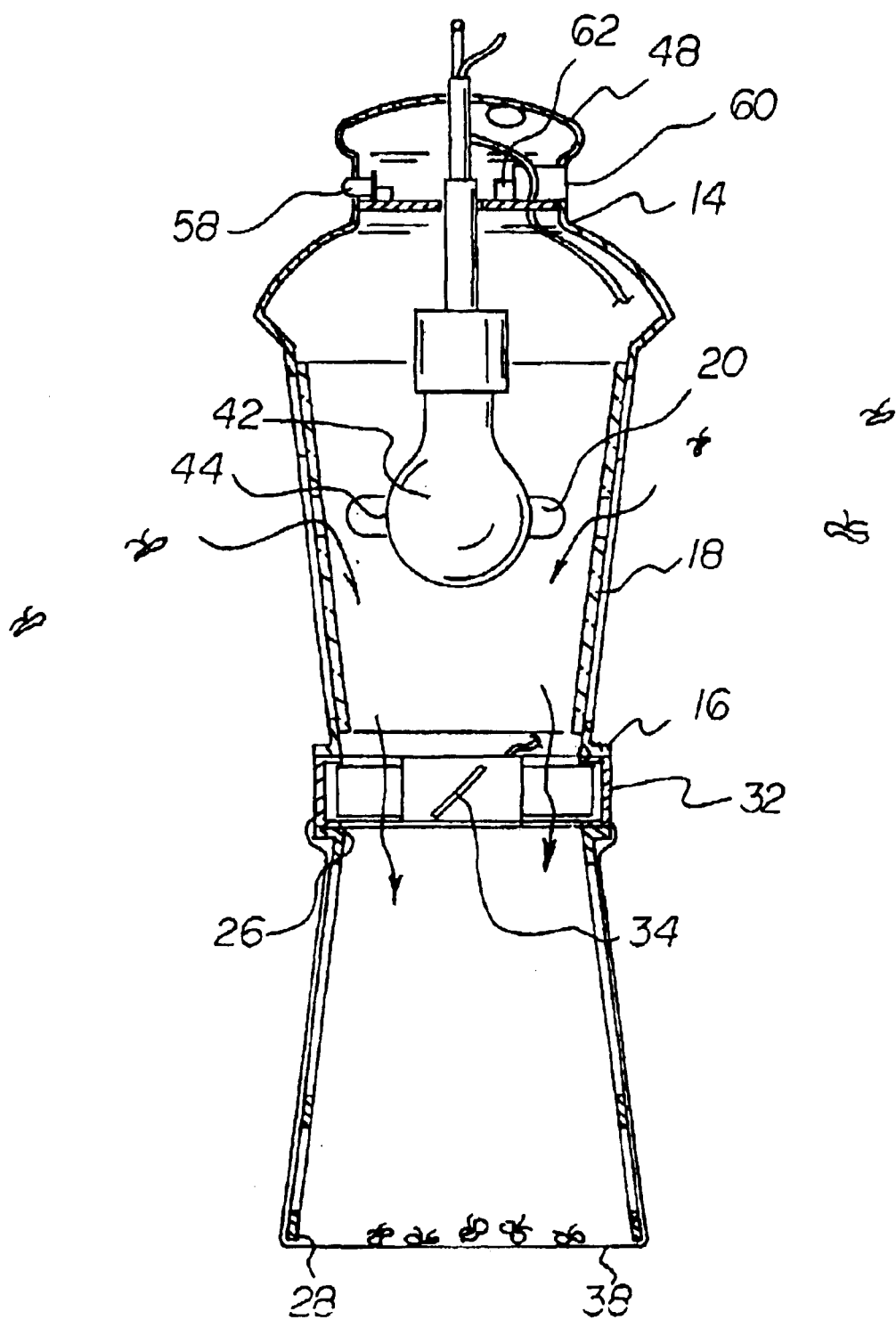
FIG. 5 is a cross-sectional view of the system taken along line 5—5 of FIG. 1.
Figure 6:
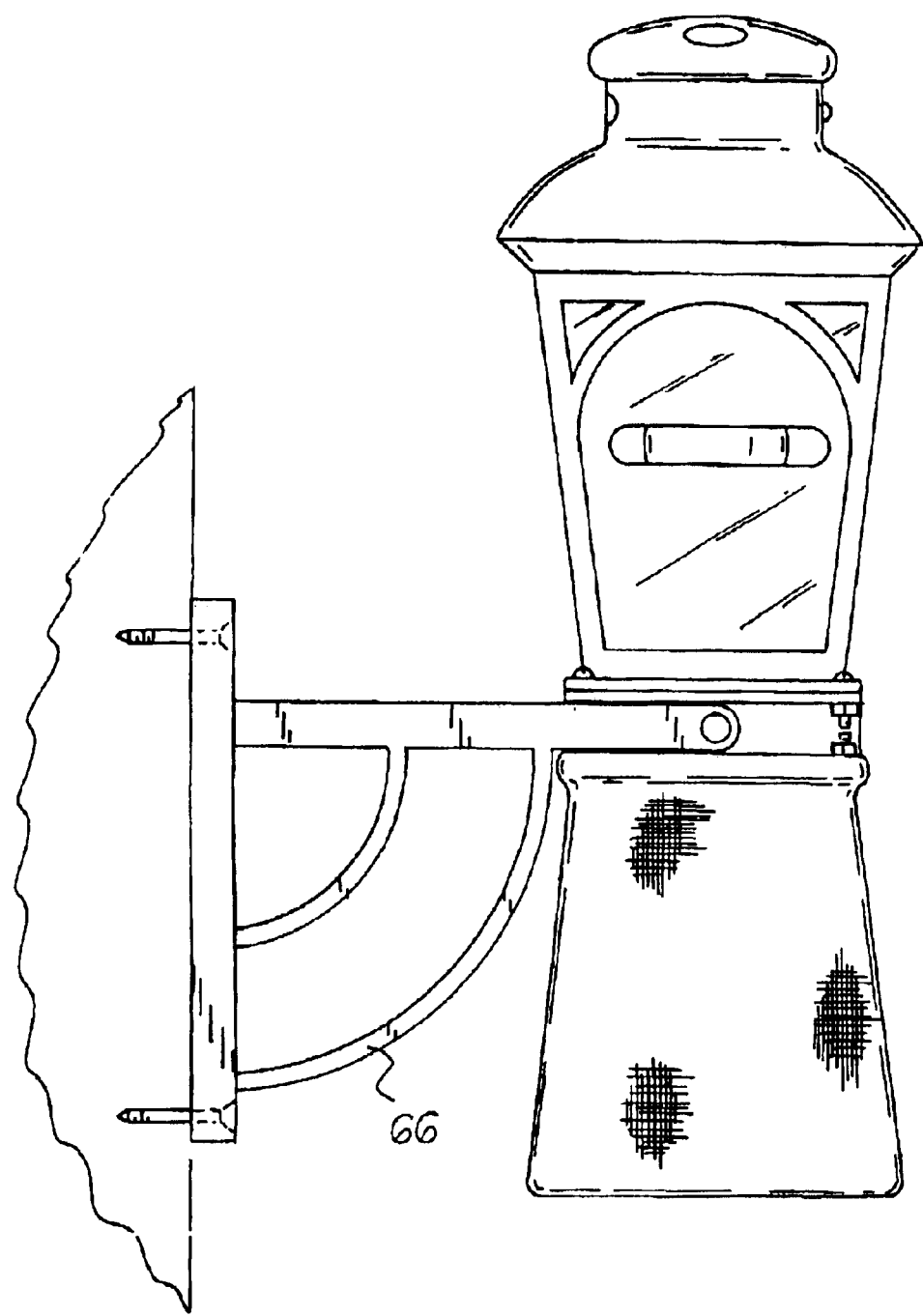
FIG. 6 is a side elevational view of an alternate embodiment of the invention.

With reference now to the drawings, and in particular to FIG. 1 thereof, the preferred embodiment of the new and improved bug killing system embodying the principles and concepts of the present invention and generally designated by the reference numeral 10 will be described.

The present invention, the bug killing system 10 is comprised of a plurality of components. Such components in their broadest context include a first housing, a second housing, a fan assembly, a mesh fabric and a source of light. Such components are individually configured and correlated with respect to each other so as to attain the desired objective.

First provided is an upper housing 12. The upper housing is fabricated of a rigid plastic material. The upper housing has an open top 14 and an open bottom 16. A sidewall 18 is provided between the open top and the open bottom. At least one slot 20 is provided in the sidewall.

A lower housing 24 is provided next. The lower housing is fabricated of a rigid plastic material. The lower housing has an open top 26. The open top is in operative association with the open bottom of the upper housing. The lower housing also has an open bottom 28 and sidewalls 30.

Next provided is a fan assembly 32. The fan assembly has blades 34. The blades are rotatable in a generally horizontal plane. The blades are removably secured between the upper housing and the lower housing. In this manner the flow of air through the slot of the upper housing and through the open bottom of the lower housing is effected.

Provided next is mesh fabric 38. The mesh fabric is a shape essentially corresponding to the shape of the lower housing. The mesh fabric is located adjacent to the sidewalls and the open bottom of the lower housing. In this manner the open top of the lower housing and the open bottom of the upper housing are left open to entrap insects entrained against the mesh fabric by the flow of air through the mesh fabric.

Also provided is a source of light 42. The source of light is provided in the upper housing with a central portion 44. The source of light is further laterally offset from the slot to attract flying insects toward the slot and into the upper housing. In this manner the flow of air from the fan will entrain the flying insects in a path of movement from the upper housing to the lower housing and then to the mesh fabric at the open bottom of the lower housing. The continued flow of air will then cause the dehydration and death of the insects.

Further provided is a removable cap 48. The removable cap is positionable on the open top of the upper housing. The removable cap has a ring 50 for support. An electrical line 52 is provided from a power supply to the source of light and the fan assembly.

Provided last are control components 56. The control components are operatively coupled to the source of light and fan assembly. The control components include a light emitting diode 58. The light emitting diode indicates that power is on to the system. The control components also include a light sensor 60. The light sensor senses the ambient condition and activates the source of light during sensed darkness. In response to the light sensor sensing darkness, the fan is operated at full speed. Full speed is approximately 3600 revolutions per minute. Operating the fan at full speed attracts and retains the flying insects to the mesh fabric. The light sensor further inactivates the source of light during sensed daylight. In response to the light sensor sensing daylight, the fan is operated at half speed. Half speed is approximately 1800 revolutions per minute. Operating the fan at half speed retains the flying insects against the mesh fabric. The control components also include a temperature sensor 62. The temperature sensor inactivates the fan but not the source of light when the temperature falls below between about 35 and 45 degrees Fahrenheit. This is for energy saving purposes.

In an alternate embodiment of the present invention the system includes a lateral support 66. The lateral support is positioned between the first and second housings. An electrical line from a power supply to the source of light and the fan assembly is provided.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bug killing system comprising:
   a first housing with an open end and a sidewall with at least one slot therein;
   a second housing having an open first end in operative association with the open end of the first housing and also having an open second end;
   a fan assembly secured between the first and second housings to effect a flow of air through the at least one slot and open second end of the second housing;
   a mesh fabric located adjacent to the open second end of the second housing to thereby entrap insects entrained against the mesh fabric by the flow of air through the mesh fabric;
   a source of light within the first housing to attract flying insects toward the at least one slot and into the first housing whereby the flow of air from the fan assembly will entrain the flying insects in a path of movement from the first housing to the second housing and then to the mesh fabric; and
   control components operatively coupled to the source of light and fan assembly including a light sensor to sense the ambient condition and to activate the source of light during sensed darkness and, in response to the light sensor sensing darkness, to operate the fan assembly at full speed to attract and retain the flying insects to the mesh fabric, and to inactivate the source of light during sensed daylight and, in response to the light sensor sensing daylight, to operate the fan assembly at half speed to retain the flying insects against the mesh fabric.

2. The system as set forth in claim 1, and further including a removable cap positioned on the top of the first housing with a ring for the support thereof and with an electrical line from a power supply to the source of light and the fan assembly.

3. The system as set forth in claim 1 and further including a lateral support positioned between a first and second housings and with an electrical line from a power supply to the source of light and the fan assembly.

4. The system as set forth in claim 1 and further including a light emitting diode to indicate that power is on to the system.

5. The system as set forth in claim 4 and further including a temperature sensor to inactivate the fan assembly when the temperature falls below between about 35 and 45 degrees Fahrenheit.

6. A bug killing system for reliably attracting, entraining and dehydrating flying insects comprising, in combination:
   an upper housing fabricated of a rigid plastic material with an open top and an open bottom and a sidewall therebetween with at least one slot therein;
   a lower housing fabricated of a rigid plastic material having an open top in operative association with the open bottom of the upper housing and also having an open bottom and sidewalls;
   a fan assembly with blades rotatable in a generally horizontal plane and removably secured between the upper housing and the lower housing to effect a flow of air through the at least one slot of the upper housing and through the open bottom of the lower housing;
   a mesh fabric having a shape essentially corresponding to the shape of the lower housing and located adjacent to the sidewalls and the open bottom of the lower housing but leaving open the open top of the lower housing and the open bottom of the upper housing to thereby entrap insects entrained against the mesh fabric by the flow of air through the mesh fabric;
   a source of light within the upper housing with a central portion laterally offset from the at least one slot to attract flying insects toward the at least one slot and into the upper housing whereby the flow of air from the fan assembly will entrain the flying insects in a path of movement from the upper housing to the lower housing and then to the mesh fabric at the open bottom of the lower housing and whereby the continued flow of air will then cause the dehydration and death of the insects;
   a removable cap positionable on the open top of the upper housing with a ring for the support thereof and with an electrical line from a power supply to the source of light and the fan assembly; and control components operatively coupled to the source of light and fan assembly including a light emitting diode to indicate that power is on to the system, the control components including a light sensor to sense the ambient condition and to activate the source of light during sensed darkness and, in response to the light sensor sensing darkness, to operate the fan assembly at full speed, approximately 3600 revolutions per minute, to attract and retain the flying insects to the mesh fabric, and to inactivate the source of light during sensed daylight and, in response to the light sensor sensing daylight, to operate the fan assembly at half speed, approximately 1800 revolutions per minute, to retain the flying insects against the mesh fabric, and the control components also including a temperature sensor to inactivate the fan assembly but not the source of light when the temperature falls below between about 35 and 45 degrees Fahrenheit.

* * * * *